United States Patent
Erickson et al.

(10) Patent No.: US 12,008,584 B2
(45) Date of Patent: *Jun. 11, 2024

(54) GRAPH CONVOLUTIONAL ANOMALY DETECTION

(71) Applicant: Optum, Inc., Minnetonka, MN (US)

(72) Inventors: Parker J. Erickson, Plymouth, MN (US); Gerald Liu, Maple Grove, MN (US); Rex Shen, Eden Prairie, MN (US); Devin Uner, Carpentersville, MN (US); George L Williams, Minnetonka, MN (US); Zachary Babcock, Elk River, MN (US); Lydia M. Narum, St. Louis Park, MN (US)

(73) Assignee: OPTUM, INC., Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/937,511

(22) Filed: Oct. 3, 2022

(65) Prior Publication Data

US 2023/0025252 A1 Jan. 26, 2023

Related U.S. Application Data

(63) Continuation of application No. 16/916,571, filed on Jun. 30, 2020, now Pat. No. 11,494,787.

(51) Int. Cl.
*G06Q 30/018* (2023.01)
*G06F 16/23* (2019.01)
(Continued)

(52) U.S. Cl.
CPC ..... *G06Q 30/0185* (2013.01); *G06F 16/2379* (2019.01); *G06F 16/9024* (2019.01);
(Continued)

(58) Field of Classification Search
CPC ............ G06Q 30/0185; G06Q 40/08; G06F 16/2379; G06F 16/9024; G06N 3/04; G06N 3/08; G06N 3/045; G06N 3/084
(Continued)

(56) References Cited

U.S. PATENT DOCUMENTS 6,981,017 B1   12/2005  Kasriel et al.
11,232,554 B1   1/2022  Do et al.
(Continued)

FOREIGN PATENT DOCUMENTS

EP            3333770 A1     6/2018

OTHER PUBLICATIONS

Aabid A. Mir et al., "Graph Anomaly Detection with Graph Convolutional Networks", Malaysian Institute of Information Technology, International Journal of Advanced Computer Science and Applications, vol. 14, No. 11 (Year: 2023).*
(Continued)

*Primary Examiner* — Frantzy Poinvil
(74) *Attorney, Agent, or Firm* — Alston & Bird LLP

(57) ABSTRACT

There is a need for more effective and efficient anomaly detection. This need can be addressed by, for example, solutions for performing/executing graph convolutional anomaly detection. In one example, a method includes identifying related graph database input data associated with a predictive entity; generating related graph feature data for the predictive entity; generating, based on the related graph feature data and using a graph convolutional neural network model, an anomaly detection score for the predictive entity, wherein at least a portion of the graph convolutional neural network model is trained using confirmation feedback data; performing an anomaly confirmation to generate the confirmation feedback data object for the predictive entity, and integrating the confirmation feedback data object for the
(Continued)

predictive entity into the confirmation feedback data associated with the graph convolutional anomaly detection.

20 Claims, 13 Drawing Sheets

(51) Int. Cl.
    *G06F 16/901*     (2019.01)
    *G06N 3/04*     (2023.01)
    *G06N 3/08*     (2023.01)
    *G06Q 40/08*     (2012.01)

(52) U.S. Cl.
    CPC ............... *G06N 3/04* (2013.01); *G06N 3/08* (2013.01); *G06Q 40/08* (2013.01)

(58) Field of Classification Search
    USPC ........................................................ 705/3–44
    See application file for complete search history.

(56) References Cited

U.S. PATENT DOCUMENTS

| | | | | |
|---|---|---|---|---|
| 11,727,246 | B2* | 8/2023 | Ma | G06N 3/082 706/25 |
| 2008/0313119 | A1* | 12/2008 | Leskovec | G06F 16/38 706/46 |
| 2009/0295561 | A1* | 12/2009 | Hu | G05B 19/41875 340/501 |
| 2013/0013488 | A1* | 1/2013 | Hu | G06Q 30/06 705/38 |
| 2013/0346294 | A1 | 12/2013 | Faith et al. | |
| 2014/0351033 | A1 | 11/2014 | Azevedo | |
| 2015/0106324 | A1* | 4/2015 | Puri | G06F 11/0706 706/52 |
| 2015/0261846 | A1 | 9/2015 | Hall et al. | |
| 2015/0294028 | A1 | 10/2015 | Bose et al. | |
| 2016/0253232 | A1* | 9/2016 | Puri | H04L 63/1425 714/37 |
| 2017/0053294 | A1 | 2/2017 | Yang et al. | |
| 2018/0248904 | A1* | 8/2018 | Villella | G06N 3/047 |
| 2018/0336436 | A1 | 11/2018 | Cheng et al. | |
| 2019/0095806 | A1 | 3/2019 | Martinez et al. | |
| 2019/0095830 | A1 | 3/2019 | Epstein et al. | |
| 2019/0205762 | A1 | 7/2019 | Sher et al. | |
| 2019/0251480 | A1 | 8/2019 | Garcia et al. | |
| 2019/0294869 | A1* | 9/2019 | Naphade | G06V 20/54 |
| 2019/0325292 | A1 | 10/2019 | Remis et al. | |
| 2020/0111013 | A1 | 4/2020 | Lee et al. | |
| 2020/0349271 | A1 | 11/2020 | Binkley et al. | |
| 2020/0351171 | A1* | 11/2020 | Ozonat | H04L 41/16 |
| 2021/0049452 | A1 | 2/2021 | Fan et al. | |
| 2021/0133670 | A1 | 5/2021 | Cella et al. | |
| 2021/0406917 | A1 | 12/2021 | Erickson et al. | |
| 2023/0229570 | A1* | 7/2023 | Cepek | G06F 11/1476 382/155 |

OTHER PUBLICATIONS

"Bending The Cost Curve: Analytic Driven Enterprise Fraud Control," LexisNexis, Apr. 2011, pp. 1-17. [Retrieved from the Internet Sep. 29, 2020]<URL: https://www.ahip.org/wp-content/uploads/2016/06/Bending-the-Cost-Curve.pdf>.

Learning Representations of Network Traffic using Deep Neural Networks for Network Anomaly Detection: A Perspective towards Oil and gas IT infrastrures:m Symmetry 12.11:1882 AG (Year: 2020).

Ganssle, Graham. "Intro To Graph Convolutional Networks," YouTube Video, Apr. 13, 2018, (21 pages). [Online]. [Retrieved from the Internet Sep. 29, 2020]<URL: https://www.youtube.com/watch?v=UAwrDY_Bcdc>.

Kipf, Thomas N. et al. "Semi-Supervised Classification With Graph Convolutional Networks," arXiv preprint arXiv:1609.02907v4, Feb. 22, 2017, pp. 1-14 pages. [Retrieved from the Internet Sep. 29, 2020]<URL: https://arxiv.org/abs/1609.02907>.

Lin, H. "Credit Card Fraud Detection With Graph Convolutional Models," Abstract, (1 page). [Retrieved from the Internet Sep. 29, 2020]<URL: https://esc.fnwi.uva.nl/thesis/centraal/files/f1191868474.pdf>.

Panigrahi, Suvasini et al. "Credit Card Fraud Detection: A Fusion Approach Using Dempster-Shafer Theory and Bayesian Learning," Information Fusion, vol. 10, No. 4, (2009), pp. 354-363. [Retrieved from the Internet Sep. 29, 2020]<URL: http://citeseerx.ist.psu.edu/viewdoc/download?doi=10.1.1.160.4964&rep=rep1&type=pdf>.

U.S. Appl. No. 16/916,571, filed Jun. 30, 2020, 2021/0406917.

* cited by examiner

| Feature B | Feature C | Feature D | Feature A |

FIG. 9

GRAPH CONVOLUTIONAL ANOMALY DETECTION

CROSS REFERENCE TO RELATED APPLICATIONS

This application is a continuation of U.S. Ser. No. 16/916,571 filed Jun. 30, 2020, which is incorporated herein in its entirety by reference.

BACKGROUND

Various embodiments of the present invention address technical challenges related to performing anomaly detection. Various embodiments of the present address the shortcomings of existing anomaly detection systems and disclose various techniques for efficiently and reliably performing anomaly detection.

BRIEF SUMMARY

In general, embodiments of the present invention provide methods, apparatus, systems, computing devices, computing entities, and/or the like for performing/executing anomaly detection. Certain embodiments utilize systems, methods, and computer program products that perform/execute anomaly detection using one or more of graph convolutional neural network models, anomaly confirmations, anomaly confirmation feedback data, confirmation occurrence indicators, and/or confirmation latency indicators.

In accordance with one aspect, a method is provided. In one embodiment, the method comprises generating, based at least in part on related graph database input data, related graph feature data for a predictive entity, wherein the related graph feature data comprises a feature vector for each related graph database object of one or more related graph database objects associated with the predictive entity; generating, based at least in part on the related graph feature data and using a graph convolutional neural network model, an anomaly detection score for the predictive entity, wherein at least a portion of the graph convolutional neural network model is trained using confirmation feedback data associated with the graph convolutional anomaly detection; responsive to a determination to perform an anomaly confirmation with respect to the predictive entity: performing the anomaly confirmation to generate the confirmation feedback data object for the predictive entity, and integrating the confirmation feedback data object for the predictive entity into the confirmation feedback data associated with the graph convolutional anomaly detection; and performing one or more responsive actions based at least in part on the anomaly detection score.

In accordance with another aspect, a computer program product is provided. The computer program product may comprise at least one computer-readable storage medium having computer-readable program code portions stored therein, the computer-readable program code portions comprising executable portions configured to generate, based at least in part on related graph database input data, related graph feature data for a predictive entity, wherein the related graph feature data comprises a feature vector for each related graph database object of one or more related graph database objects associated with the predictive entity; generate, based at least in part on the related graph feature data and using a graph convolutional neural network model, an anomaly detection score for the predictive entity, wherein at least a portion of the graph convolutional neural network model is trained using confirmation feedback data associated with the graph convolutional anomaly detection; responsive to a determination to perform an anomaly confirmation with respect to the predictive entity: perform the anomaly confirmation to generate the confirmation feedback data object for the predictive entity, and integrate the confirmation feedback data object for the predictive entity into the confirmation feedback data associated with the graph convolutional anomaly detection; and perform one or more responsive actions based at least in part on the anomaly detection score.

In accordance with yet another aspect, an apparatus comprising at least one processor and at least one memory including computer program code is provided. In one embodiment, the at least one memory and the computer program code may be configured to, with the processor, cause the apparatus to generate, based at least in part on related graph database input data, related graph feature data for a predictive entity, wherein the related graph feature data comprises a feature vector for each related graph database object of one or more related graph database objects associated with the predictive entity; generate, based at least in part on the related graph feature data and using a graph convolutional neural network model, an anomaly detection score for the predictive entity, wherein at least a portion of the graph convolutional neural network model is trained using confirmation feedback data associated with the graph convolutional anomaly detection; responsive to a determination to perform an anomaly confirmation with respect to the predictive entity: perform the anomaly confirmation to generate the confirmation feedback data object for the predictive entity, and integrate the confirmation feedback data object for the predictive entity into the confirmation feedback data associated with the graph convolutional anomaly detection; and perform one or more responsive actions based at least in part on the anomaly detection score.

BRIEF DESCRIPTION OF THE DRAWINGS

Figure 1:
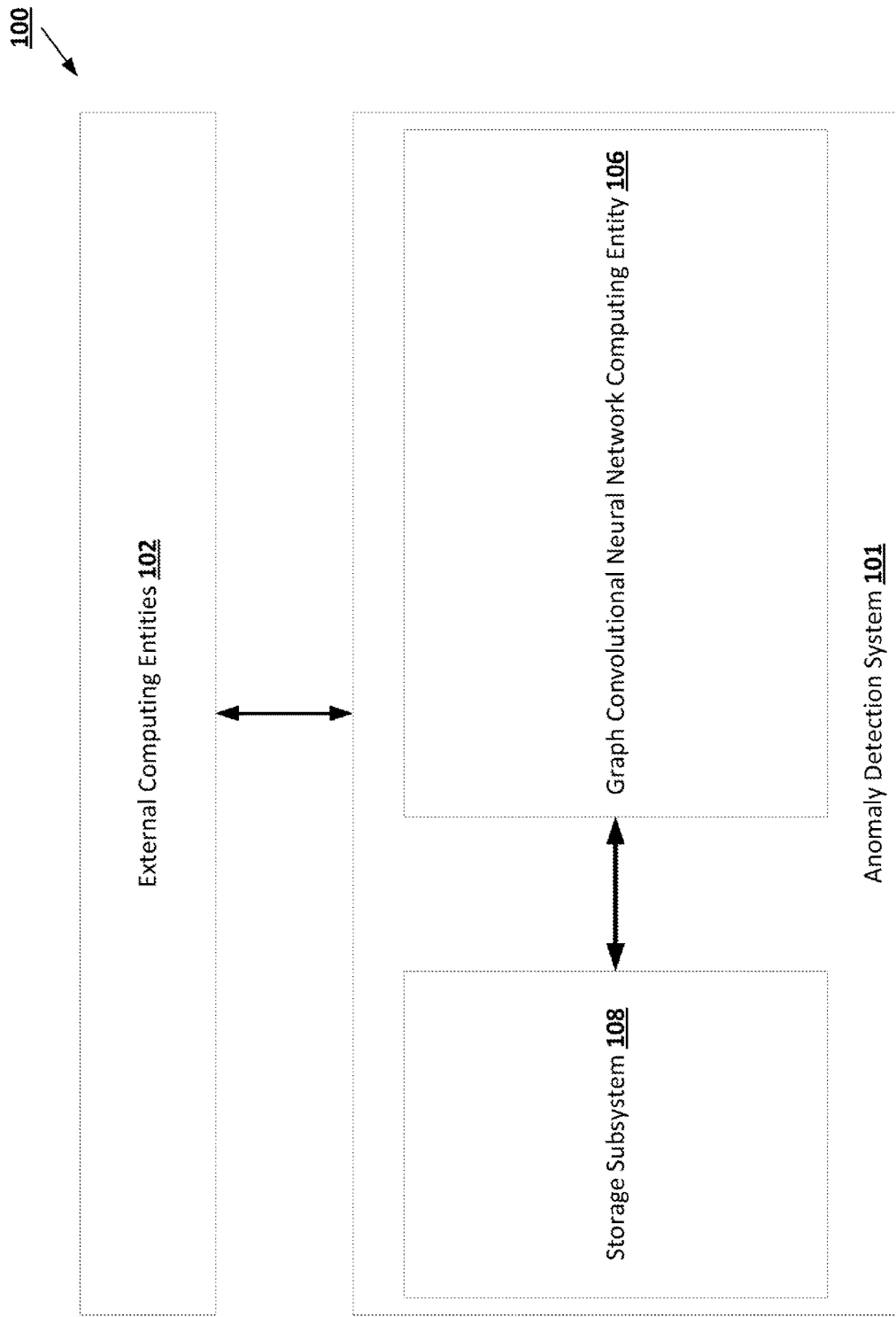

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
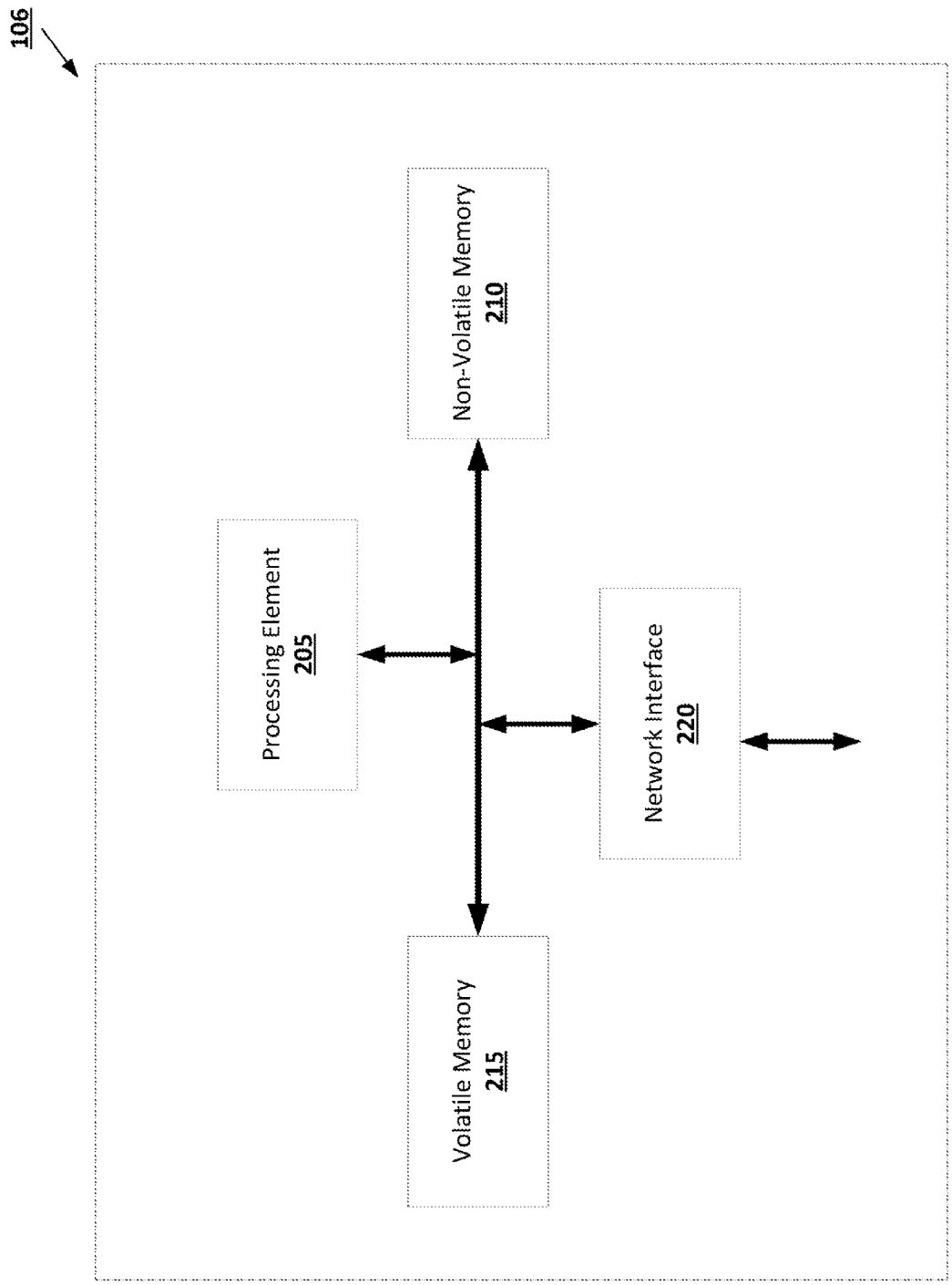

FIG. 2 provides an example graph convolutional neural network computing entity in accordance with some embodiments discussed herein.

Figure 3:
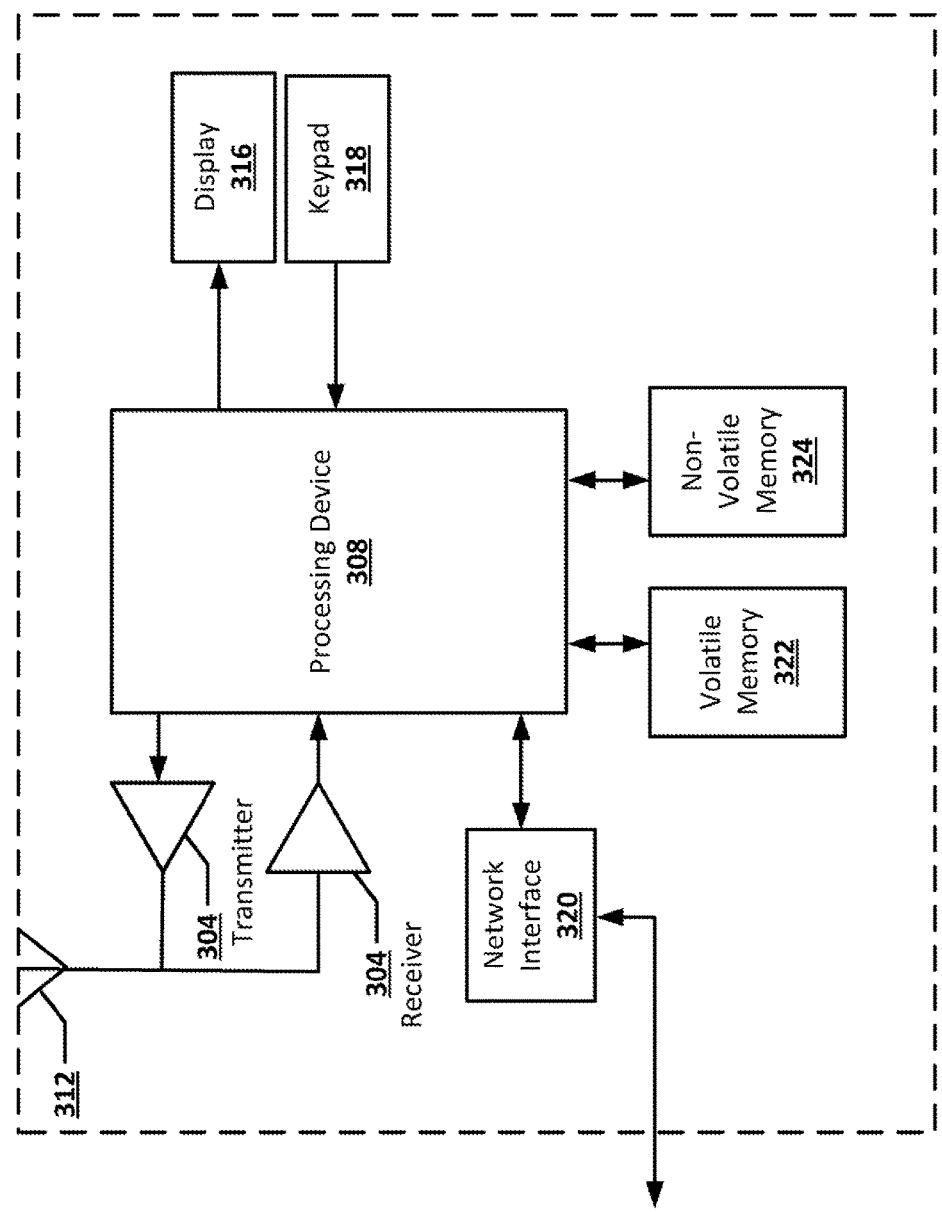

FIG. 3 provides an example external computing entity in accordance with some embodiments discussed herein.

Figure 4:
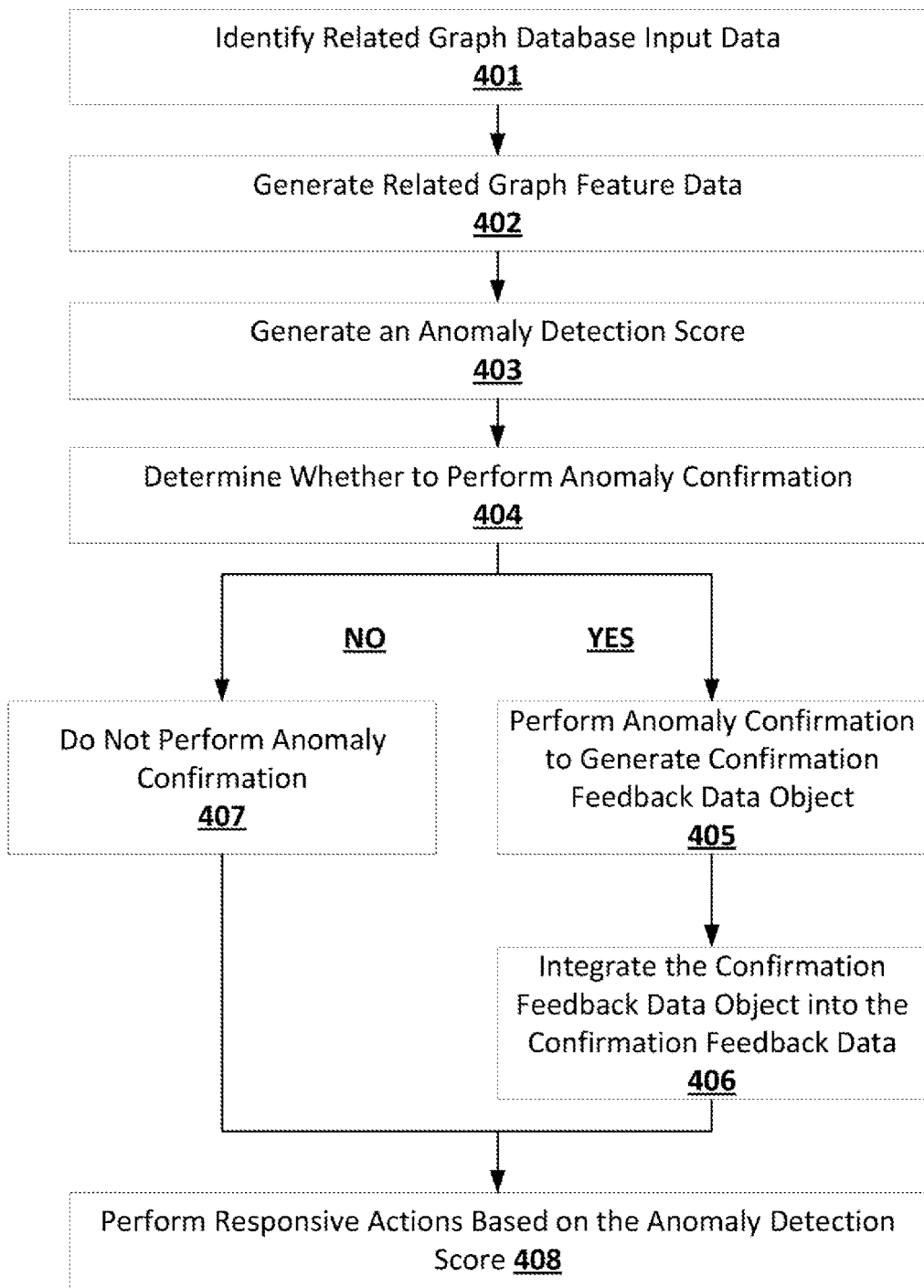

FIG. 4 is a flowchart diagram of an example process for performing graph convolutional anomaly detection in accordance with some embodiments discussed herein.

Figure 5:
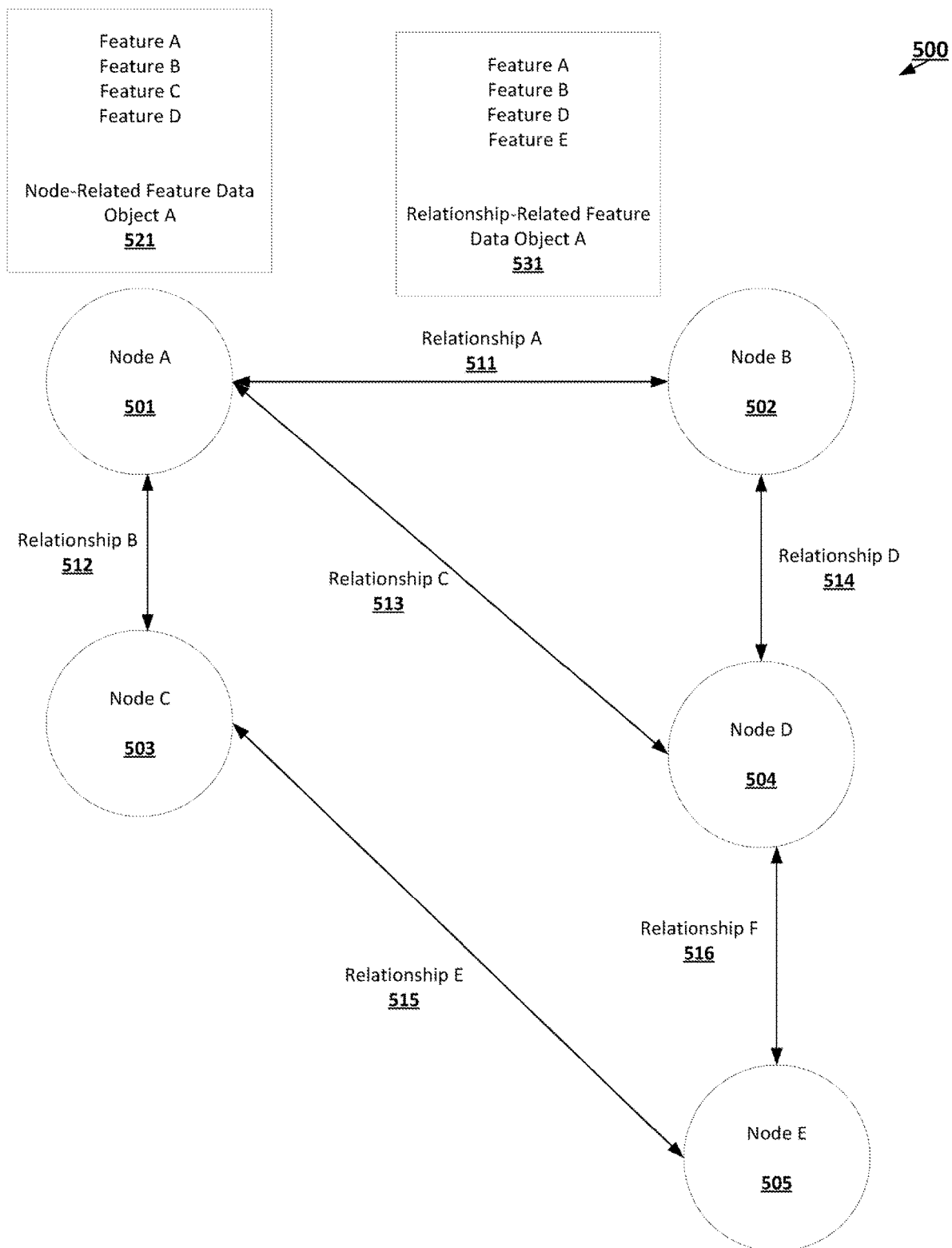

FIG. 5 provides an operational example of a graph database in accordance with some embodiments discussed herein.

Figure 6:
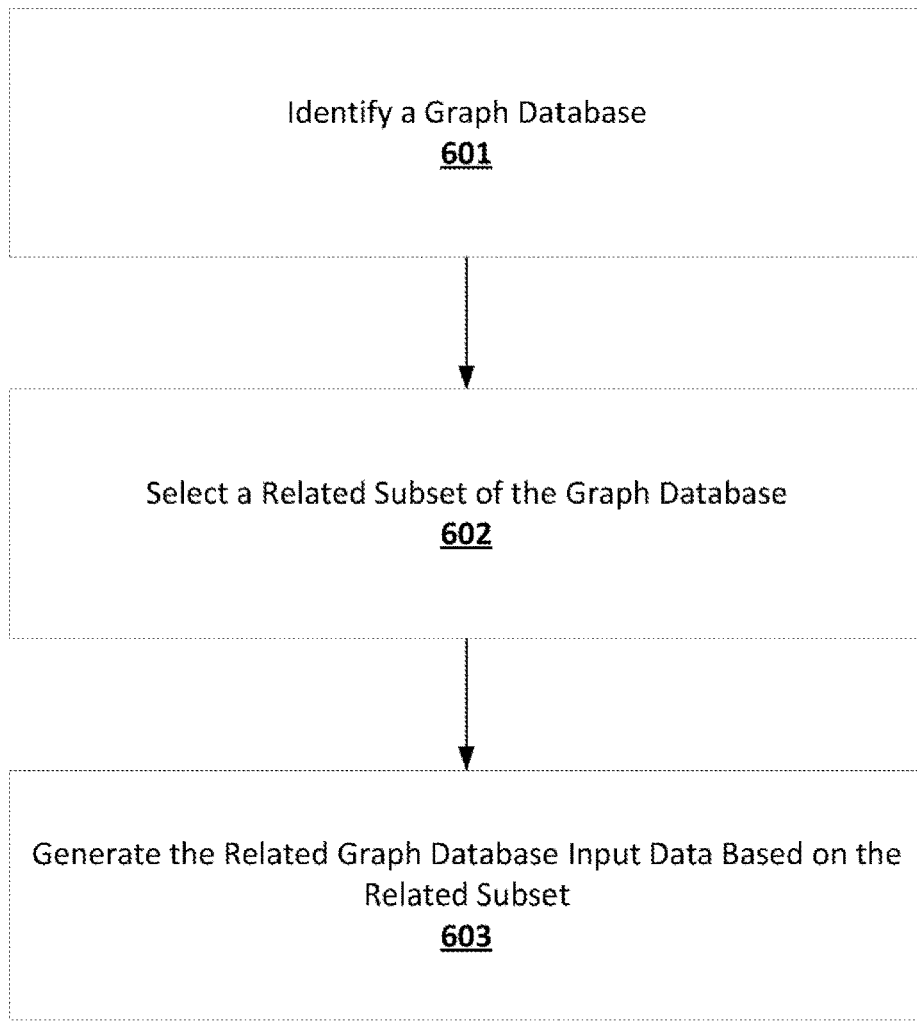

FIG. 6 is a flowchart diagram of an example process for generating graph database input data for a predictive entity in accordance with some embodiments discussed herein.

Figure 7:
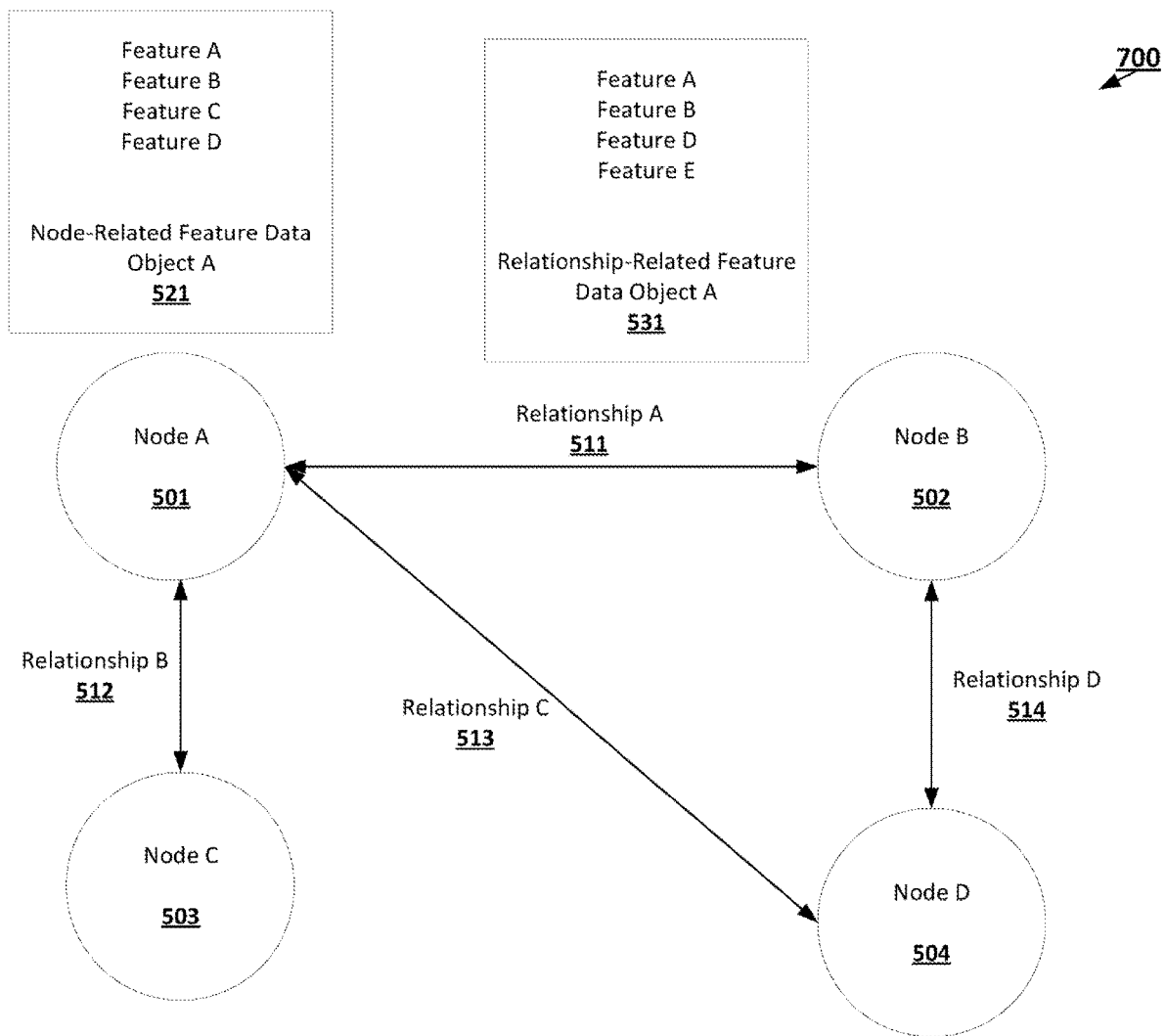

FIG. 7 provides an operational example of a graph database related subset in accordance with some embodiments discussed herein.

Figure 8:
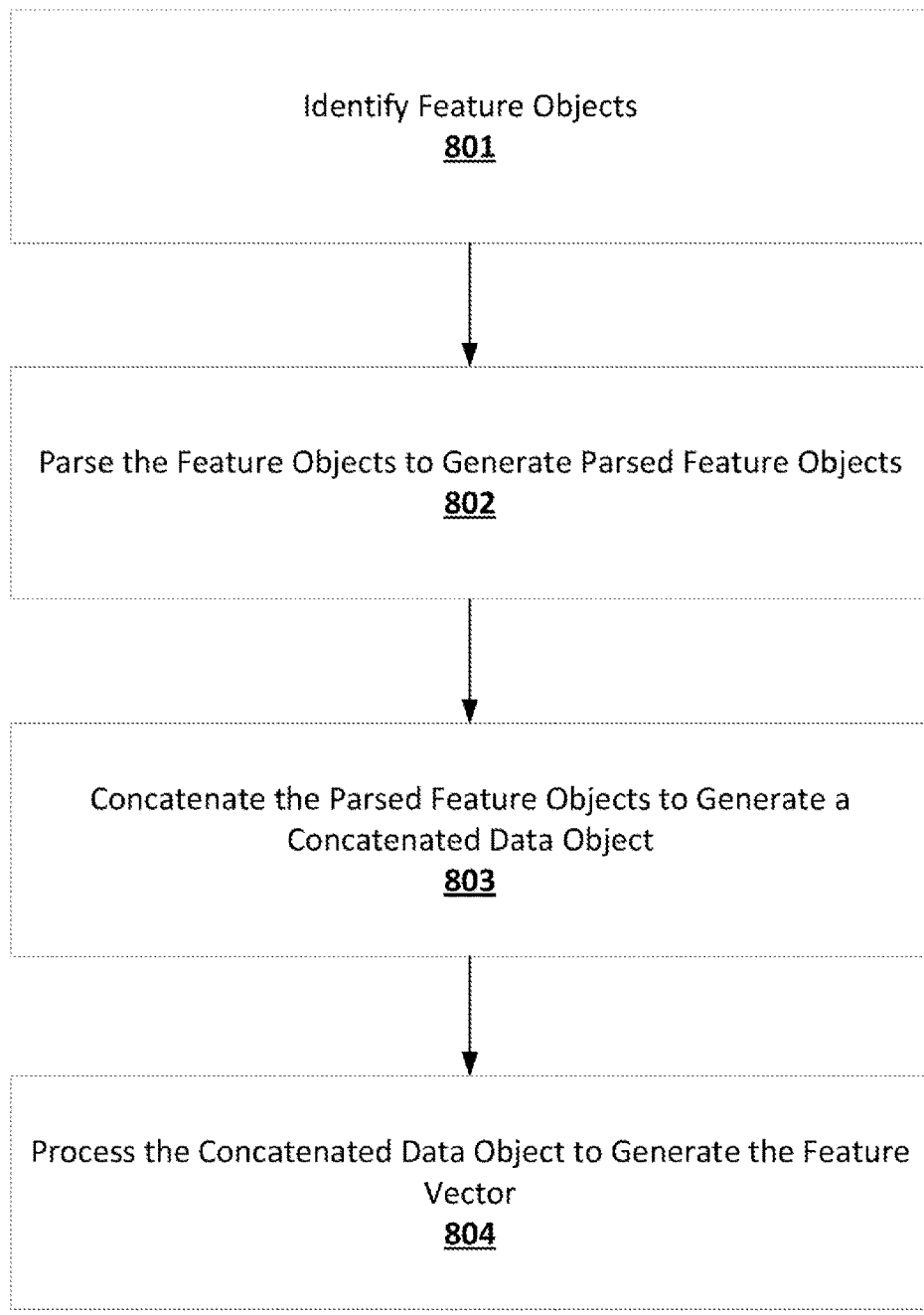

FIG. 8 is a flowchart diagram of an example process for generating a feature vector for a related graph database object in accordance with some embodiments discussed herein.

Figure 9:
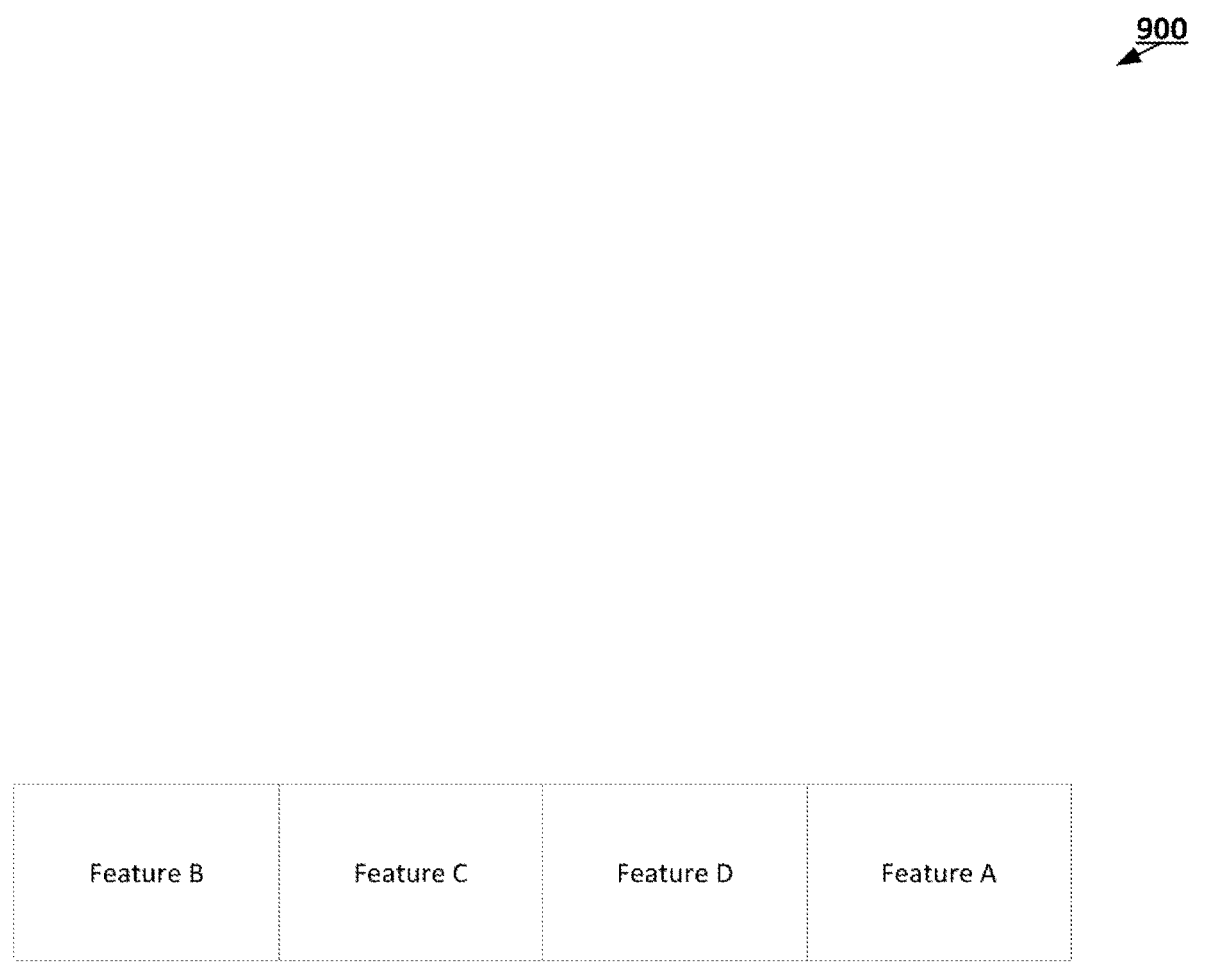

FIG. 9 provides an operational example of a concatenated graph feature data object in accordance with some embodiments discussed herein.

Figure 10:
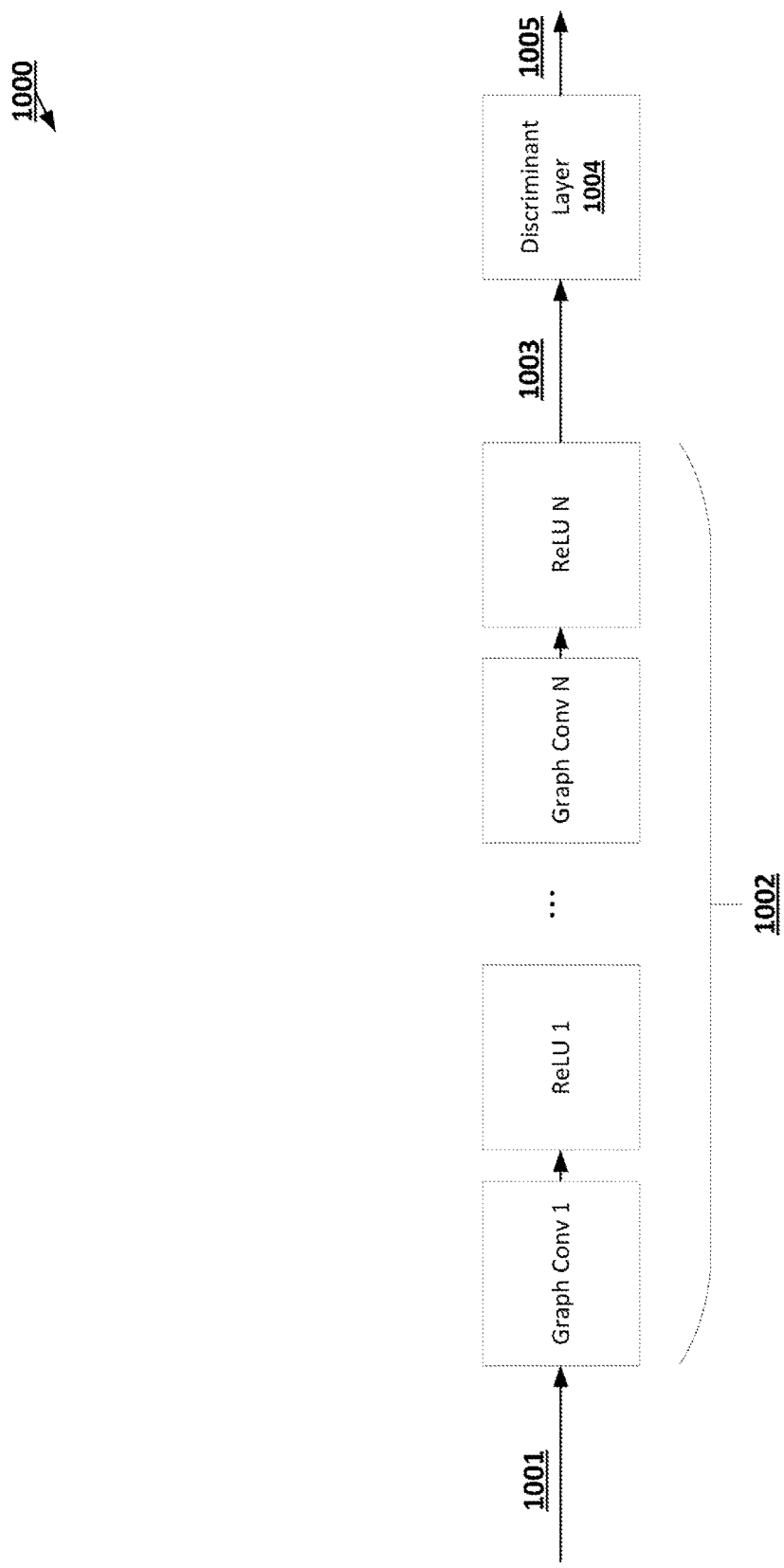

FIG. 10 provides an operational example of a graph convolutional neural network in accordance with some embodiments discussed herein.

Figure 11:
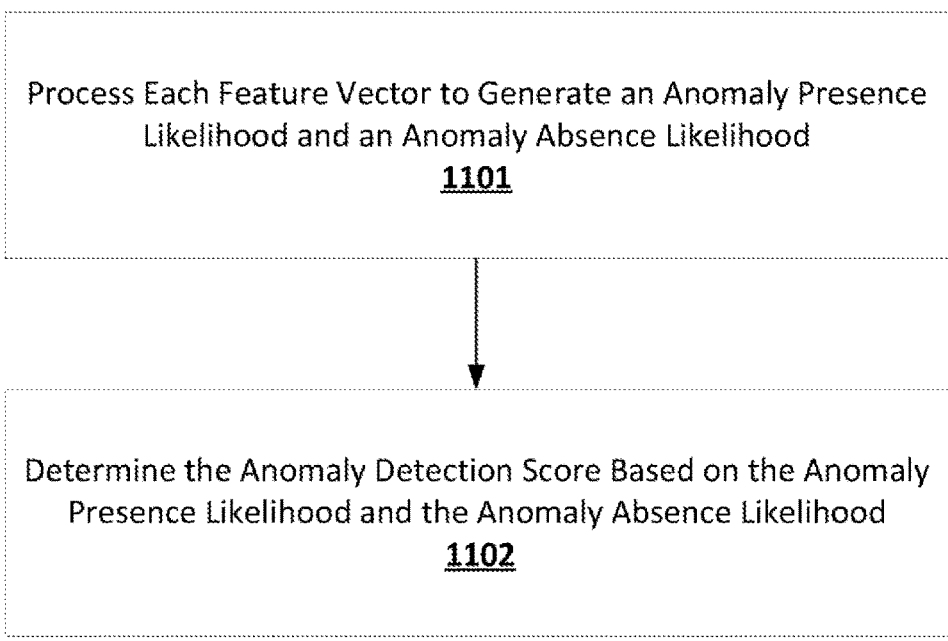

FIG. 11 is a flowchart diagram of an example process for generating an anomaly detection score in accordance with some embodiments discussed herein.

Figure 12:
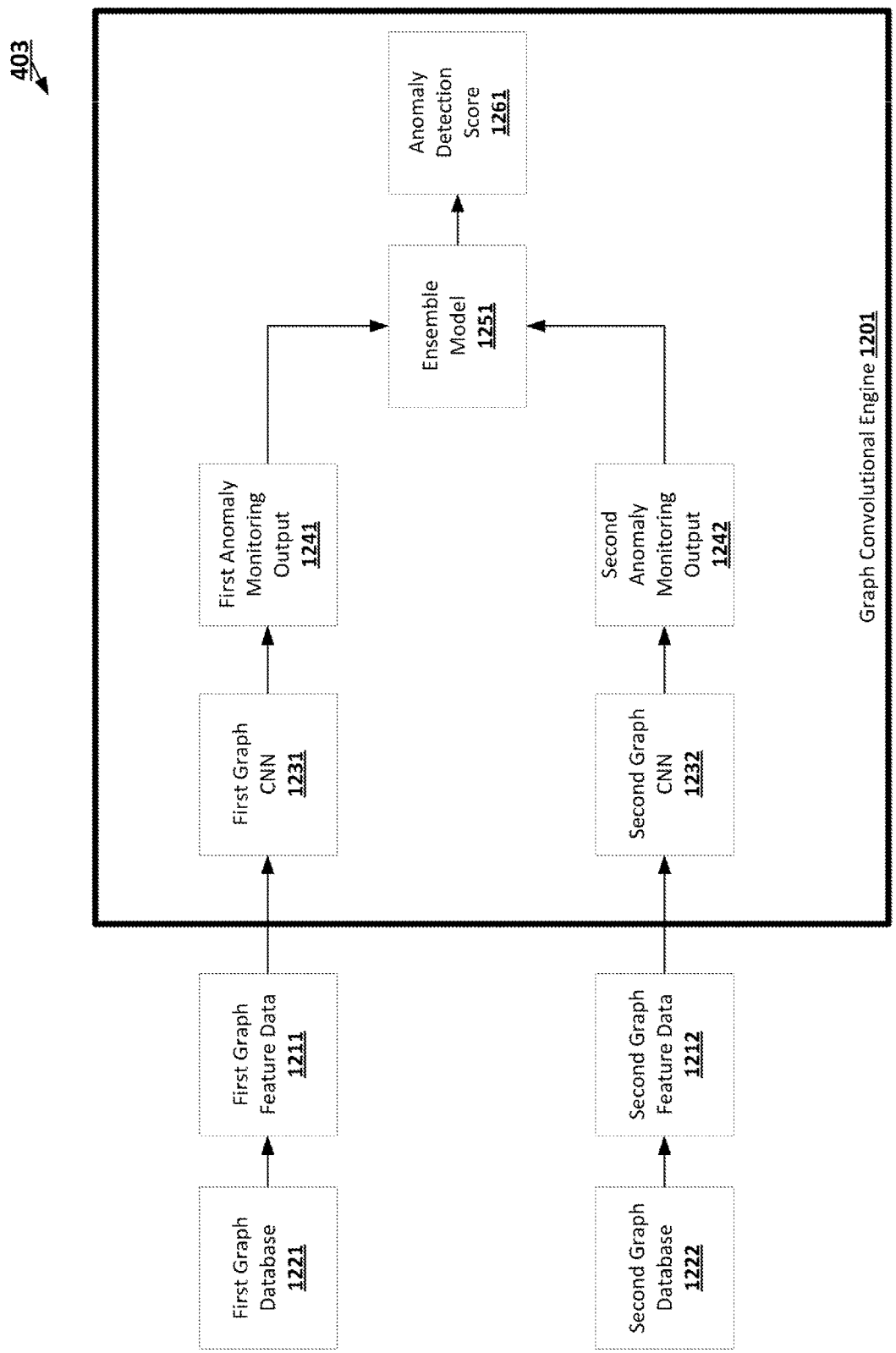

FIG. 12 is a data flow diagram of an example process for generating an anomaly detection score using a distributed database architecture in accordance with some embodiments discussed herein.

Figure 13:
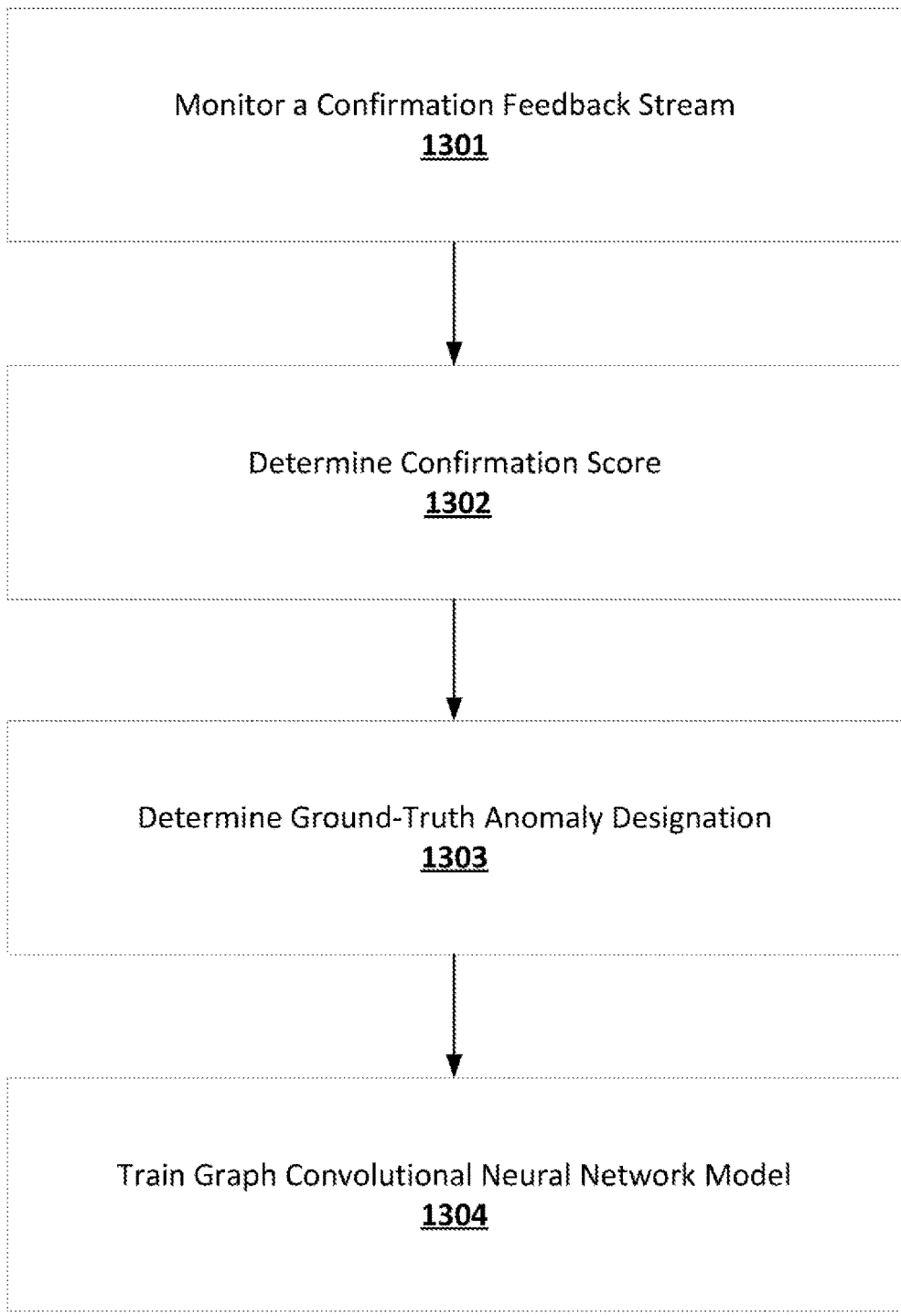

FIG. 13 is a flowchart diagram of an example process for training a graph convolutional neural network using feedback confirmation data in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Various embodiments of the present invention address technical challenges related to performing real-time or near-real-time anomaly detection using graph input data. Graph input data provide a powerful source of predictive input data. As a result, recent machine learning models such as graph convolutional neural network models have attempted with varying degrees of success to utilize such graph input data to perform predictive inferences. However, because of structural complexity of graph-based databases, the existing solutions for graph-based processing systems are inefficient and unreliable for real-time or near-real-time predictive tasks such as various anomaly detection tasks. The resulting challenges have hampered the ability of developers to utilize vast amounts of graph-based data and recent advancements in graph-based machine learning models to perform real-time or near-real-time predictive tasks such as various anomaly detection tasks.

To address the noted challenges associated related to performing real-time or near-real-time anomaly detection using graph input data. According to some aspects of the present invention, a graph convolutional model used for anomaly detection is retrained using confirmation feedback data in order to enhance the real-time accuracy and dependability of the model without requiring expensive re-design and re-training operations that may require taking the model offline.

For example, in some embodiments, in response to determining to perform the anomaly confirmation with respect to the predictive entity, a proposed system performs the anomaly confirmation to generate the confirmation feedback data object for the predictive entity, and integrates the confirmation feedback data object for the predictive entity into confirmation feedback data associated with a particular graph convolutional anomaly detection task. In some other embodiments, a proposed system monitors a confirmation feedback stream to determine one or more feedback properties of a confirmation feedback data object; determines, based at least in part on the one or more feedback properties, a confirmation score for an anomaly detection score; determines, based at least in part on the confirmation score, a ground-truth anomaly designation for a predictive entity; and trains a graph convolutional neural network model based at least in part on the ground-truth anomaly designation.

By utilizing the above-noted techniques, various embodiments of the present invention provide innovative techniques for improving real-time or near-real-time application of graph-based machine learning models such as graph convolutional neural networks. Moreover, by improving real-time or near-real-time application of graph-based machine learning models such as graph convolutional neural networks, various embodiments of the present invention provide innovative techniques for performing real-time or near-real-time anomaly detection using graph input data. In doing so, various embodiments of the present invention make important technical contributions to efficiency, effectiveness, and reliability of both graph-based machine learning models such as graph convolutional neural networks and anomaly detection systems such as fraud detection systems.

II. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. Examples of higher-level programming languages include Java, C, C#, Python, and/or the like. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

FIG. 1 is a schematic diagram of an example architecture 100 for performing/executing anomaly detection. The architecture 100 includes an anomaly detection 101 configured to receive anomaly detection requests from external computing entities 102, process the anomaly detection requests to generate anomaly detection outputs, provide the anomaly detection systems to the external computing entities 102, and automatically perform anomaly resolution policies in response to detecting anomaly scenarios. An example of an anomaly detection task is a financial fraud detection task, a health insurance fraud detection task, and a medical insurance fraud detection task.

In some embodiments, anomaly detection system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The anomaly detection system 101 may include a graph convolutional neural network computing entity 106 and a storage subsystem 108. The graph convolutional neural network computing entity 106 may be configured to receive anomaly detection requests from one or more external computing entities 102, process the anomaly detection requests to generate anomaly detection outputs, provide the anomaly detection systems to the external computing entities 102, and automatically perform anomaly resolution policies in response to detecting anomaly scenarios.

The storage subsystem 108 may be configured to store input data used by the graph convolutional neural network computing entity 106 to perform anomaly detection as well as model definition data used by the graph convolutional neural network computing entity 106 to perform anomaly detection. The storage subsystem 108 may further be configured to store configuration data associated with the anomaly detection system 101, such as configuration data associated with the graph-based databases maintained by the anomaly detection system 101 and/or configuration data associated with the operation of the graph convolutional neural network computing entity 106.

The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Graph Convolutional Neural Network Computing Entity

FIG. 2 provides a schematic of a graph convolutional neural network computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the graph convolutional neural network computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the graph convolutional neural network computing entity 106 may include or be in communication with one or more processing elements 205 (also referred to as processors, processing circuitry, and/or similar terms used herein interchangeably) that communicate with other elements within the graph convolutional neural network computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the graph convolutional neural network computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the graph convolutional neural network computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the graph convolutional neural network computing entity 106 with the assistance of the processing element 205 and operating system.

As indicated, in one embodiment, the graph convolutional neural network computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the graph convolutional neural network computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the graph convolutional neural network computing entity 106 may include or be in communication with one or more input elements, such as a keyboard input, a mouse input, a touch screen/display input, motion input, movement input, audio input, pointing device input, joystick input, keypad input, and/or the like. The graph convolutional neural network computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the graph convolutional neural network computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the graph convolutional neural network computing entity 106 via a network interface 320.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the graph convolutional neural network computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the graph convolutional neural network computing entity 106 and/or various other computing entities.

In another embodiment, the external computing entity 102 may include one or more components or functionality that are the same or similar to those of the graph convolutional neural network computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

IV. EXEMPLARY SYSTEM OPERATIONS

To address the challenges associated related to performing real-time or near-real-time anomaly detection using graph input data. According to some aspects of the present invention, a graph convolutional model used for anomaly detection is retrained using confirmation feedback data in order to enhance the real-time accuracy and dependability of the model without requiring expensive re-design and re-training operations that may require taking the model offline. For example, in some embodiments, in response to determining to perform the anomaly confirmation with respect to the predictive entity, a proposed system performs the anomaly confirmation to generate the confirmation feedback data object for the predictive entity, and integrates the confirmation feedback data object for the predictive entity into confirmation feedback data associated with a particular graph convolutional anomaly detection task. In some other embodiments, a proposed system monitors a confirmation feedback stream to determine one or more feedback properties of a confirmation feedback data object; determines, based at least in part on the one or more feedback properties, a confirmation score for an anomaly detection score; determines, based at least in part on the confirmation score, a ground-truth anomaly designation for a predictive entity; and trains a graph convolutional neural network model based at least in part on the ground-truth anomaly designation.

By utilizing the above-noted techniques, various embodiments of the present invention provide innovative techniques for improving real-time or near-real-time application of graph-based machine learning models such as graph convolutional neural networks. Moreover, by improving real-time or near-real-time application of graph-based machine learning models such as graph convolutional neural networks, various embodiments of the present invention provide innovative techniques for performing real-time or near-real-time anomaly detection using graph input data. In doing so, various embodiments of the present invention make important technical contributions to efficiency, effectiveness, and reliability of both graph-based machine learning models such as graph convolutional neural networks and anomaly detection systems such as fraud detection systems.

FIG. 4 is a flowchart diagram of an example process 400 for performing graph convolutional anomaly detection. Via the various steps/operations of process 400, the graph convolutional neural network computing entity 106 can efficiently and effectively perform predictive inference using graph database input data and by utilizing a graph convolutional neural network model that is trained using a reliable and efficient confirmation-based training routine. While various embodiments of the graph convolutional predictive inference concepts discussed herein are described with reference to anomaly detection (e.g., fraud detection), a person of ordinary skill in the relevant technology will recognize that the disclosed techniques can also be utilized to perform other graph-based predictive inference tasks in an effective and efficient.

The process 400 begins at step/operation 401 when the graph convolutional neural network computing entity 106 identifies related graph database input data associated with a predictive entity. In some embodiments, the related graph database input data include data retrieved from one or more graph databases. A graph database is any database that stores data as nodes (aka. vertices) and relationships (aka. edges) between the noted nodes. In some embodiments, a graph database may further store node-related features and relationship-related features. In some embodiments, a graph database may store node-related features as relationships between primary nodes and feature-describing nodes. In some embodiments, a graph database may further enable storing relationships between relationships.

An operational example of a graph database 500 is presented in FIG. 5. As depicted in FIG. 5, the graph database 500 includes five nodes 501-505 as well as six relationships 511-516: the relationship A 511 between the node A 501 and the node B 502, the relationship B 512 between the node A 501 and the node C 503, the relationship C 513 between the node A 501 and the node D 504, the relationship D 514 between the node B 502 and the node D 504, the relationship E 515 between the node C 503 and the node E 505, and the relationship F 516 between the node D 504 and the node E 505. Moreover, as further depicted in FIG. 5, the graph database 500 includes node-related feature data object A 521 for the node A 501 and relationship-related feature data object A 531 for the relationship A 511.

Returning to FIG. 4, in some embodiments, a graph convolutional neural network computing entity 106 may retrieve related graph database input data (e.g., node definition data, node-related feature data, relationship definition data, relationship-related feature data, etc.) from one or more graph databases. In some embodiments, the graph convolutional neural network computing entity 106 may generate the related graph database input data by retrieving non-graph database input data (e.g., relational database input data, object-oriented database input data, non-relational database input data such as NoSQL database input data and JSON database input data, etc.) from one or more non-graph databases, detecting one or more graph database objects (e.g., node graph database objects, relationship graph database objects, node-related feature graph database objects, relationship-related graph feature database objects, etc.) among the non-graph database input data, and generating the related graph database input data based on at least a subset of the detected graph database objects.

In some embodiments, step/operation 401 may be performed in accordance with the process described in FIG. 6, which is a flowchart diagram of an example process for generating graph database input data for a predictive entity. The process depicted in FIG. 6 begins at step/operation 601 when the graph convolutional neural network computing entity 106 identifies a graph database including a plurality of graph database objects. Examples of graph data objects include node graph database objects, relationship graph database objects, node-related graph database objects, relationship-related graph database objects, etc. In some embodiments, the graph convolutional neural network computing entity 106 generates the graph database by detecting a designated number of graph database objects (e.g., node graph database objects, relationship graph database objects, node-related feature graph database objects, relationship-related feature graph database objects, etc.) among particular non-graph database input data. In some embodiments, the number, ordering, and/or format of the detected graph database objects is determined based on an input structure of a graph convolutional neural network model described below with reference to step/operation 403.

At step/operation 602, the graph convolutional neural network computing entity 106 selects a related subset of the plurality of graph database objects identified in step/operation 601, where the graph database objects in the related subset are deemed to be related to the predictive entity. In some embodiments, a predictive entity refers to a data object that describes a real-world phenomenon about which a predictive inference is performed. In some embodiments, a predictive entity may correspond to a collection of one or more graph database nodes and/or one or more graph database relationships.

For example, in a graph-based transactional record database that records transactions performed by particular IP addresses as relationships between transaction nodes and IP-address nodes, a predictive entity may correspond to a particular relationship between a corresponding transaction node and a corresponding IP-address node, where the objective of predictive inference may be to detect whether the transaction described by the particular relationship is a fraudulent transaction. As another example, in a graph-based transactional record database that records transactions performed by particular IP addresses as relationships between transaction nodes and IP-address nodes and transactions performed at particular times between particular user profiles as relationships between transaction nodes and user profile nodes, a predictive entity may correspond to a particular transaction node and all its associated relationships include the relationship between the corresponding transaction node and a corresponding IP-address node and the relationships between the corresponding transaction node and any corresponding user profile nodes, where the objective of predictive inference may be to detect whether the transaction described by the particular relationships is a fraudulent transaction.

An operational example of a graph database related subset 700 for a particular predictive entity is depicted in FIG. 7. As depicted in FIG. 7, the exemplary graph database related subset 700 includes nodes A-C 501-502, node D 503, relationships A-C 511-513 (i.e., the relationship A 511 between the node A 501 and the node B 502, the relationship B 512 between the node A 501 and the node C 503, and the relationship C 513 between the node A 501 and the node D 504), and feature objects associated with the noted nodes and relationships (i.e., node-related feature data object A 521 for the node A and relationship-related feature data object A 531 for the relationship A 511).

Returning to FIG. 6, at step/operation 603, the graph convolutional neural network computing entity 106 generates the related graph database input data based at least in part on the related subset of the plurality of graph database objects. In some embodiments, the graph convolutional neural network computing entity 106 selects each graph database object in the related subset of the plurality of graph database objects. In some embodiments, the graph convolutional neural network computing entity 106 filters a reduced subset of graph database objects in the related subset of the plurality of graph database objects based on input structure of a graph convolutional neural network model described with reference to step/operation 403.

In some embodiments, the graph convolutional neural network computing entity 106 generates a reduced subset of graph database objects in the related subset of the plurality of graph database objects by performing one or more dimensionality reductions and/or feature embedding operations on the graph database objects in the related subset of the plurality of graph database objects in accordance with the input structure of a graph convolutional neural network model described with reference to step/operation 403. In some embodiments, the graph convolutional neural network computing entity 106 generates a reduced subset of graph database objects in the related subset of the plurality of graph database objects by performing one or more dimensionality reductions and/or feature embedding operations on the graph database objects in the related subset of the plurality of graph database objects in accordance with one or more trained parameters.

Returning to FIG. 4, at step/operation 402, the graph convolutional neural network computing entity 106 generates related graph feature data for the predictive entity based on the related graph database input data for the predictive entity. In some embodiments, the related graph feature data includes a feature vector for each related graph database object of one or more related graph database objects associated with the predictive entity. In some embodiments, a feature vector is a data vector that includes feature data for a corresponding related graph database object. Feature data of a related graph database object may include features of the related graph database object retrieved from a corresponding graph database, features of the related graph database object generated at runtime, and/or trained features of the related graph database object. In some embodiments, the format of each vector is determined based on the input structure of a graph convolutional neural network model described with reference to step/operation 403.

In some embodiments, step/operation 402 may be performed in accordance with the process depicted in FIG. 8, which is a flowchart diagram of an example process for generating a feature vector for a related graph database object. The process depicted in FIG. 8 begins at step/operation 801 when the graph convolutional neural network computing entity 106 identifies one or more feature objects associated with the related graph database objects. Feature objects of a related graph database object may include feature objects of the related graph database object retrieved from a corresponding graph database, feature objects of the related graph database object generated at runtime, and/or feature objects of the related graph database object determined based on one or more trained parameter values and/or trained weight values associated with the related graph database object.

At step/operation 802, the graph convolutional neural network computing entity 106 parses the feature objects to generate one or more parsed feature objects. In some embodiments, the graph convolutional neural network computing entity 106 parses the feature objects using one or more trained parsing parameters determined using a training algorithm. In some embodiments, the graph convolutional neural network computing entity 106 parses the feature objects in accordance with the input structure of a graph convolutional neural network model described with reference to step/operation 403.

At step/operation 803, the graph convolutional neural network computing entity 106 concatentates the one or more parsed feature objects into a concatenated data object. In some embodiments, the graph convolutional neural network computing entity 106 concatentates the one or more parsed feature objects in accordance with a static concatenation order. In some embodiments, the graph convolutional neural network computing entity 106 concatentates the one or more parsed feature objects in accordance with a dynamic concatenation order, e.g., a dynamic concatenation order determined based on one or more trained concatenation parameters. In some embodiments, the graph convolutional neural network computing entity 106 concatentates the one or more parsed feature objects in accordance with the input structure of a graph convolutional neural network model described with reference to step/operation 403. An operational example of a concatenated data object 900 for the node A 501 of the graph database 500 of FIG. 5 is depicted in FIG. 9.

At step/operation 804, the graph convolutional neural network computing entity 106 processes the concatenated data object using a vectorization model to generate the feature vector for the related graph database object. In some embodiments, by utilizing concatenated data objects to generate feature vectors which are then mapped using graph relationship data and/or graph structure definition data, the graph convolutional neural network computing entity 106 can integrate both relationships between data and the contents of data into performing predictive inference, thus enhancing the richness of the underlying data used to perform graph convolutional predictive inference, which in turn increases efficiency and reliability of graph-based predictive inferences.

Returning to FIG. 4, at step/operation 403, the graph convolutional neural network computing entity 106 generates an anomaly detection score for the predictive entity based on the related graph feature data and using a graph convolutional neural network model. In some embodiments, an anomaly detection score indicates a predicted designation of a corresponding predictive entity as either anomalous or non-anomalous. In some embodiments, an anomaly detection score indicates a predicted likelihood that a corresponding predictive entity is either anomalous or not anomalous. In some embodiments, at least a portion of the graph convolutional neural network model is trained using confirmation feedback data associated with the graph convolutional anomaly detection, as further described below. In some embodiments, the graph convolutional neural network model may include one or more graph convolutional neural networks, which is an example of a machine learning model configured to process input data including graph-based data and perform one or more graph convolution operations on the underlying input data in order to generate one or more prediction outputs. A graph convolution operation may be any operation that, solely or in combination with one or more operations, reduces complexity of a graph-based input by applying some attention-based mechanism to the graph-based input.

An operational example of a graph convolutional neural network 1000 is depicted in FIG. 10. As depicted in FIG. 10, the graph convolutional neural network 1000 is configured to receive the graph-based input 1001, processes the graph-based input 1001 through a processing stage 1002 that includes a number of successive graph-based convolutions followed by rectified linear unit activations to generate a convolutional feature 1003, and processes the convolutional feature 1003 using a discriminant layer 1004 to generate a prediction output 1005. In some embodiments, each combination of a graph convolution followed by a rectified linear unit activation performs the operations described by the below equation:

$$H \leftarrow \text{ReLU}(H'\theta), \qquad \text{Equation 1}$$

where H is a convolutional feature generated by the combination, ReLU refers to a rectified linear unit activation function, H' is an input of the graph convolution, and θ describes convolution parameters used to perform graph convolution. In some embodiments, the structure of H' and H is determined based on an input structure defined by θ. In some embodiments, H' and H are a function of several variables including hyper-parameters defined by θ.

In some embodiments, step/operation 403 can be performed in accordance with the process depicted in FIG. 11, which is a flowchart diagram of an example process for generating the anomaly detection score for a predictive entity. The process depicted in FIG. 11 begins at step/operation 1101 when the graph convolutional neural network computing entity 106 processes each feature vector for a related graph database object of the one or more related graph database objects using a first graph convolutional neural network of the graph convolutional neural network model to generate an anomaly presence likelihood for the predictive entity and an anomaly absence likelihood for the predictive entity. In some embodiments, the anomaly presence likelihood indicates a likelihood that the predictive entity is anomalous. In some embodiments, the anomaly absence likelihood indicates a likelihood that the predictive entity is not anomalous.

At step/operation 1102, the graph convolutional neural network computing entity 106 determines the anomaly detection score based at least in part on the anomaly presence likelihood and the anomaly absence likelihood. In some embodiments, the graph convolutional neural network computing entity 106 determines an anomaly detection score indicating an anomaly detection if the anomaly presence likelihood outweighs the anomaly absence likelihood. In some embodiments, the graph convolutional neural network computing entity 106 determines an anomaly detection score indicating an anomaly detection if the anomaly presence likelihood outweighs the anomaly absence likelihood by a threshold parameter, where the threshold parameter may be a static parameter, a dynamic parameter, or a trained parameter. In some embodiments, the related graph database input data is associated with a first graph database of a plurality of graph databases from which the related graph database input data is retrieved, and the anomaly detection score is determined based at least in part on the anomaly monitoring output of each graph database of the plurality of graph databases.

In some embodiments, step/operation 403 can be performed in accordance with the process depicted in FIG. 12, which is a data flow diagram of an example process for generating the anomaly detection score for a predictive entity using a distributed database architecture. As depicted in FIG. 12, a graph convolutional engine 1201 of the graph convolutional neural network computing entity 106 receives first graph feature data 1211 for a first graph database 1221 and second graph feature data 1212 for a second graph database 1222. As further depicted in FIG. 12, the graph convolutional engine 1201 processes the first graph feature data 1211 for the first graph database 1221 using a first graph convolutional neural network model 1231 to generate a first anomaly monitoring output 1241. Furthermore, the graph convolutional engine 1201 processes the second graph feature data 1212 for the second graph database 1222 using a second graph convolutional neural network model 1232 to generate a second anomaly monitoring output 1242. Moreover, the graph convolutional engine 1201 utilizes an ensemble model 1251 to generate the anomaly detection score 1261 for the predictive entity based on combining both of the first anomaly monitoring output 1241 and the second anomaly monitoring output 1242.

Returning to FIG. 4, at step/operation 404, the graph convolutional neural network computing entity 106 determines, based at least in part on the anomaly detection score, whether to perform anomaly confirmation with respect to the predictive entity in order to generate a confirmation feedback data object for the predictive entity. In some embodiments, anomaly confirmation is an automated and/or manual process for determining whether a predictive entity is anomalous. In some embodiments, performing anomaly confirmation is deemed to be operationally and/or computationally more costly than detecting anomaly detection scores. In some embodiments, by detecting anomaly detection scores, the graph convolutional neural network computing entity 106 can prescreen potentially anomalous predictive entities to reduce the number of predictive entities that require costly anomaly confirmations, thus increasing operational and/or computational efficiency of anomaly detection systems. In some embodiments, an anomaly confirmation includes an automated and/or manual fraud investigation system. In some embodiments, the related graph database input data is retrieved from a transactional record database; and the anomaly detection score is a fraudulent transaction detection score.

In response to determining to perform the anomaly confirmation with respect to the predictive entity in order to generate the confirmation feedback data object for the predictive entity, the graph convolutional neural network computing entity 106 performs the anomaly confirmation to generate the confirmation feedback data object for the predictive entity at step/operation 405 and integrates the confirmation feedback data object for the predictive entity into confirmation feedback data associated with the graph convolutional anomaly detection (e.g., confirmation data used to train the graph convolutional neural network model) at step/operation 406. In response to determining not to perform the anomaly confirmation, the graph convolutional neural network computing entity 106 does not perform the anomaly confirmation at step/operation 407. In some embodiments, integrating the confirmation feedback data object for the predictive entity into confirmation feedback data includes generating ground-truth training data based on the result of the anomaly confirmation and using the ground-truth training data to re-train the graph convolutional neural network model.

In some embodiments, step/operation 406 can be performed in accordance with the process depicted in FIG. 13, which is a flowchart diagram of an example process for training a graph convolutional neural network using feedback confirmation data. The process depicted in FIG. 13 begins at step/operation 1301 when the graph convolutional neural network computing entity 106 monitors a confirmation feedback stream to determine one or more feedback properties of a feedback data object. In some embodiments, a confirmation feedback stream is any data stream that periodically presents new feedback data objects. In some embodiments, a feedback property of a feedback data object is a data object that describes a characteristic of the feedback data object, such as whether the feedback data object confirms a detection of anomaly risk (i.e., a confirmation occurrence indicator) and how much delay exists between a detection of anomaly risk for a predictive entity and the confirmation of the noted detection (i.e., a confirmation latency indicator).

At step/operation 1302, the graph convolutional neural network computing entity 106 determines a confirmation score for an anomaly detection score associated with the feedback data object based on the feedback properties of the feedback data object. In some embodiments, the confirmation score is a Boolean value that is set in accordance with the confirmation occurrence indicator for the feedback data object. In some embodiments, the confirmation score is a continuous value that is set in accordance with a group of feedback properties. In some embodiments, the confirmation score is generated based on a confirmation score generation machine learning model configured to apply trained parameters to the feedback properties in order to generate the confirmation score for the anomaly detection score.

At step/operation 1303, the graph convolutional neural network computing entity 106 determines a ground-truth anomaly designation for the predictive entity associated with the feedback data object based on the confirmation score for the anomaly detection score. In some embodiments, a ground-truth data object is a value configured to be used as a target output during training of the graph convolutional neural network model. In some embodiments, in response to determining that the confirmation score falls below a threshold and/or indicates an incorrect anomaly detection score, the graph convolutional neural network computing entity 106 determines a ground-truth anomaly designation and adds the ground-truth anomaly designation to the training data for the graph convolutional neural network. In some embodiments, the graph convolutional neural network computing entity 106 determines a ground-truth anomaly designation and adds the ground-truth anomaly designation to the training data for the graph convolutional neural network regardless of the confirmation score for the anomaly detection score. Thus, in some embodiments, the graph convolutional neural network computing entity 106 uses a constant feedback loop to update its training data based on anomaly confirmations, e.g., based on fraud investigation results.

At step/operation 1304, the graph convolutional neural network computing entity 106 trains the graph convolutional neural network model based on the ground-truth anomaly designation. In some embodiments, the graph convolutional neural network computing entity 106 trains the graph convolutional neural network model based on the entirety of its training data with the addition of the ground-truth anomaly designation. In some embodiments (e.g., when the graph convolutional neural network utilizes an online learning component), the graph convolutional neural network computing entity 106 simply updates parameters of the pre-trained graph convolutional neural network model based on an error value determined with respect to an inferred value for the predictive entity and the ground-truth anomaly designation determined based on the feedback data object. In some embodiments, the graph convolutional neural network computing entity 106 trains the graph convolutional neural network model using an optimization-based training algorithm such as gradient descent or gradient descent with backpropagation.

Returning to FIG. 4, at step/operation 408, the graph convolutional neural network computing entity 106 performs one or more responsive actions based on the anomaly detection score. In some embodiments, the graph convolutional neural network computing entity 106 is configured to utilize a trained graph convolutional neural network model in order to detect various types of anomalies such as fraudulent activities. In some embodiments, upon detecting anomalies such as fraudulent activities, the graph convolutional neural network computing entity 106 is configured to automatically perform one or more responsive actions, such as automatic closing of financial accounts, automatic notifications to account holders, automatic audits of medical providers, etc. In some embodiments, the graph convolutional neural network computing entity 106 is configured to provide a real-time fraud detection interface to one or more administrative users. In some embodiments, the graph convolutional neural network computing entity 106 is configured to automatically re-train one or more graph convolutional neural networks based on outputs of anomaly confirmations such as fraud investigations. In some embodiments, the graph convolutional neural network computing entity 106 is configured to automatically assign predicted anomaly detection cases to investigators based on factors such as investigator expertise, severity of predicted anomaly, recall rates of cases reviewed by the investigator, etc.

By utilizing the above-noted techniques, various embodiments of the present invention provide innovative techniques for improving real-time or near-real-time application of graph-based machine learning models such as graph convolutional neural networks. Moreover, by improving real-time or near-real-time application of graph-based machine learning models such as graph convolutional neural networks, various embodiments of the present invention provide innovative techniques for performing real-time or near-real-time anomaly detection using graph input data. In doing so, various embodiments of the present invention make important technical contributions to efficiency, effectiveness, and reliability of both graph-based machine learning models such as graph convolutional neural networks and anomaly detection systems such as fraud detection systems.

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
generating, based at least in part on related graph database input data, related graph feature data for a predictive entity, wherein the related graph feature data comprises a feature vector for each related graph database object of one or more related graph database objects associated with the predictive entity;
generating, based at least in part on the related graph feature data and using a graph convolutional neural network model, an anomaly detection score for the predictive entity, wherein at least a portion of the graph convolutional neural network model is trained using confirmation feedback data associated with a graph convolutional anomaly detection;
responsive to a determination to perform an anomaly confirmation with respect to the predictive entity:
performing the anomaly confirmation to generate a confirmation feedback data object for the predictive entity, and
integrating the confirmation feedback data object for the predictive entity into the confirmation feedback data associated with the graph convolutional anomaly detection; and
initiating the performance of one or more responsive actions based at least in part on the anomaly detection score.

2. The computer-implemented method of claim 1, further comprising:
identifying a graph database, wherein the graph database comprises a plurality of graph database objects;
selecting a related subset of the plurality of graph database objects that are deemed to be related to the predictive entity; and
generating the related graph database input data based at least in part on the related subset.

3. The computer-implemented method of claim 1, wherein generating the related graph feature data comprises:
for each related graph database object of the one or more related graph database objects,
identifying one or more feature objects associated with the related graph database object,
parsing the one or more feature objects to generate one or more parsed feature objects,
concatenating the one or more parsed feature objects into a concatenated data object, and
processing the concatenated data object using a vectorization model to generate the feature vector for the related graph database object.

4. The computer-implemented method of claim 1, wherein generating the anomaly detection score comprises:
processing each feature vector for a related graph database object of the one or more related graph database objects using a first graph convolutional neural network of the graph convolutional neural network model to generate an anomaly presence likelihood for the predictive entity and an anomaly absence likelihood for the predictive entity; and
determining the anomaly detection score based at least in part on the anomaly presence likelihood and the anomaly absence likelihood.

5. The computer-implemented method of claim 1, wherein:
the related graph database input data is associated with a first graph database of a plurality of graph databases from which the related graph database input data is retrieved, and the anomaly detection score is determined based at least in part on anomaly monitoring output of each graph database of the plurality of graph databases.

6. The computer-implemented method of claim 1, wherein integrating the confirmation feedback data object for the predictive entity into the confirmation feedback data associated with the graph convolutional anomaly detection comprises:
  monitoring a confirmation feedback stream to determine one or more feedback properties of the confirmation feedback data object;
  determining, based at least in part on the one or more feedback properties, a confirmation score for the anomaly detection score;
  determining, based at least in part on the confirmation score, a ground-truth anomaly designation for the predictive entity; and
  training the graph convolutional neural network model based at least in part on the ground-truth anomaly designation.

7. The computer-implemented method of claim 6, wherein the ground-truth anomaly designation is assigned a convolutional score based at least in part on the confirmation score.

8. The computer-implemented method of claim 6, wherein the one or more feedback properties comprise a confirmation occurrence indicator and a confirmation latency indicator.

9. The computer-implemented method of claim 1, wherein:
  the related graph database input data is retrieved from a transactional record database; and
  the anomaly detection score is a fraudulent transaction detection score.

10. The computer-implemented method of claim 1, wherein a feature structure of the related graph feature data is determined based at least in part on an input structure of the graph convolutional neural network model.

11. A computing system comprising one or more processors and at least one memory including program code, the at least one memory and the program code configured to, with the one or more processors, cause the computing system to at least:
  generate, based at least in part on related graph database input data, related graph feature data for a predictive entity, wherein the related graph feature data comprises a feature vector for each related graph database object of one or more related graph database objects associated with the predictive entity;
  generate, based at least in part on the related graph feature data and using a graph convolutional neural network model, an anomaly detection score for the predictive entity, wherein at least a portion of the graph convolutional neural network model is trained using confirmation feedback data associated with a graph convolutional anomaly detection;
  responsive to a determination to perform an anomaly confirmation with respect to the predictive entity:
    perform the anomaly confirmation to generate a confirmation feedback data object for the predictive entity, and
    integrate the confirmation feedback data object for the predictive entity into the confirmation feedback data associated with the graph convolutional anomaly detection; and
  initiate the performance of one or more responsive actions based at least in part on the anomaly detection score.

12. The computing system of claim 11, the one or more processors further configured to:
  identify a graph database, wherein the graph database comprises a plurality of graph database objects;
  select a related subset of the plurality of graph database objects that are deemed to be related to the predictive entity; and
  generate the related graph database input data based at least in part on the related subset.

13. The computing system of claim 11, the one or more processors further configured to:
  for each related graph database object of the one or more related graph database objects,
    identify one or more feature objects associated with the related graph database object,
    parse the one or more feature objects to generate one or more parsed feature objects,
    concatenate the one or more parsed feature objects into a concatenated data object, and
    process the concatenated data object using a vectorization model to generate the feature vector for the related graph database object.

14. The computing system of claim 11, the one or more processors further configured to:
  process each feature vector for a related graph database object of the one or more related graph database objects using a first graph convolutional neural network of the graph convolutional neural network model to generate an anomaly presence likelihood for the predictive entity and an anomaly absence likelihood for the predictive entity; and
  determine the anomaly detection score based at least in part on the anomaly presence likelihood and the anomaly absence likelihood.

15. The computing system of claim 11, wherein:
  the related graph database input data is associated with a first graph database of a plurality of graph databases from which the related graph database input data is retrieved, and
  the anomaly detection score is determined based at least in part on anomaly monitoring output of each graph database of the plurality of graph databases.

16. The computing system of claim 11, the one or more processors further configured to:
  monitor a confirmation feedback stream to determine one or more feedback properties of the confirmation feedback data object;
  determine, based at least in part on the one or more feedback properties, a confirmation score for the anomaly detection score;
  determine, based at least in part on the confirmation score, a ground-truth anomaly designation for the predictive entity; and
  train the graph convolutional neural network model based at least in part on the ground-truth anomaly designation.

17. The computing system of claim 16, wherein the one or more feedback properties comprise a confirmation occurrence indicator and a confirmation latency indicator.

18. The computing system of claim 11, wherein:
  the related graph database input data is retrieved from a transactional record database; and
  the anomaly detection score is a fraudulent transaction detection score.

19. The computing system of claim 11, wherein a feature structure of the related graph feature data is determined based at least in part on an input structure of the graph convolutional neural network model.

20. One or more media including instructions that, when executed by one or more processors, cause the one or more processors to:
generate, based at least in part on related graph database input data, related graph feature data for a predictive entity, wherein the related graph feature data comprises a feature vector for each related graph database object of one or more related graph database objects associated with the predictive entity;
generate, based at least in part on the related graph feature data and using a graph convolutional neural network model, an anomaly detection score for the predictive entity, wherein at least a portion of the graph convolutional neural network model is trained using confirmation feedback data associated with a graph convolutional anomaly detection;
responsive to a determination to perform an anomaly confirmation with respect to the predictive entity:
perform the anomaly confirmation to generate a confirmation feedback data object for the predictive entity, and
integrate the confirmation feedback data object for the predictive entity into the confirmation feedback data associated with the graph convolutional anomaly detection; and
initiate the performance of one or more responsive actions based at least in part on the anomaly detection score.

* * * * *

UNITED STATES PATENT AND TRADEMARK OFFICE
CERTIFICATE OF CORRECTION

| | |
|---|---|
| PATENT NO. | : 12,008,584 B2 |
| APPLICATION NO. | : 17/937511 |
| DATED | : June 11, 2024 |
| INVENTOR(S) | : Parker J. Erickson et al. |

It is certified that error appears in the above-identified patent and that said Letters Patent is hereby corrected as shown below:

On the Title Page

In Column 1, Item (72), Inventors, Line 5, delete "L" and insert -- L. --, therefor.

In the Claims

In Column 23, Line 3, Claim 20, delete "more" and insert -- more non-transitory computer-readable storage --, therefor.

Signed and Sealed this
Nineteenth Day of November, 2024

Katherine Kelly Vidal
*Director of the United States Patent and Trademark Office*